United States Patent
Azuma

(10) Patent No.: US 11,354,063 B2
(45) Date of Patent: Jun. 7, 2022

(54) MEMORY SYSTEM

(71) Applicant: KIOXIA CORPORATION, Tokyo (JP)

(72) Inventor: Tetsuhiko Azuma, Shinagawa Tokyo (JP)

(73) Assignee: KIOXIA CORPORATION, Tokyo (JP)

(*) Notice: Subject to any disclaimer, the term of this patent is extended or adjusted under 35 U.S.C. 154(b) by 54 days.

(21) Appl. No.: 16/556,020

(22) Filed: Aug. 29, 2019

(65) Prior Publication Data

US 2020/0301603 A1    Sep. 24, 2020

(30) Foreign Application Priority Data

Mar. 19, 2019  (JP) .............................. JP2019-050808

(51) Int. Cl.
*G06F 3/00* (2006.01)
*G06F 3/06* (2006.01)

(52) U.S. Cl.
CPC .......... *G06F 3/0658* (2013.01); *G06F 3/0604* (2013.01); *G06F 3/0656* (2013.01); *G06F 3/0659* (2013.01); *G06F 3/0688* (2013.01)

(58) Field of Classification Search
CPC .... G06F 3/0658; G06F 3/0604; G06F 3/0656; G06F 3/0659; G06F 3/0688
See application file for complete search history.

(56) References Cited

U.S. PATENT DOCUMENTS

| | | | |
|---|---|---|---|
| 8,533,403 B1* | 9/2013 | Law | G06F 13/1605 711/151 |
| 2003/0076855 A1* | 4/2003 | Chamberlain | H04L 47/13 370/447 |
| 2012/0047299 A1* | 2/2012 | Sasaki | G06F 13/3625 710/244 |
| 2015/0095621 A1* | 4/2015 | Toyoda | G06F 13/366 712/221 |
| 2018/0188991 A1 | 7/2018 | Dash et al. | |

FOREIGN PATENT DOCUMENTS

JP    2000-267943 A    9/2000
JP    2011-191867 A    9/2011

* cited by examiner

*Primary Examiner* — Craig S Goldschmidt
(74) *Attorney, Agent, or Firm* — Kim & Stewart LLP

(57) ABSTRACT

A memory system includes a plurality of non-volatile memory chips divided into a plurality of storage areas, and a memory controller that is connected to the plurality of memory chips to control an operation of each memory chip. The memory controller is configured to set an arbitration period separately for each of the respective storage areas, and to execute a process to store data into the storage areas one after another in accordance with the arbitration period set therefor.

20 Claims, 14 Drawing Sheets

| LOGICAL CHIP NUMBER | PHYSICAL CHIP NUMBER |
|---|---|
| 0 | 3 |
| 1 | 2 |
| 2 | 1 |
| 3 | 0 |
| 4 | 5 |
| 5 | 6 |
| 6 | 7 |
| 7 | 4 |
| ... | ... |

| LOGICAL ADDRESS | PHYSICAL ADDRESS |
|---|---|
| L0 | P1 |
| L1 | P2 |
| L2 | P3 |
| L3 | P6 |
| L4 | P7 |
| L5 | P0 |
| L6 | P4 |
| L7 | P5 |
| ... | ... |

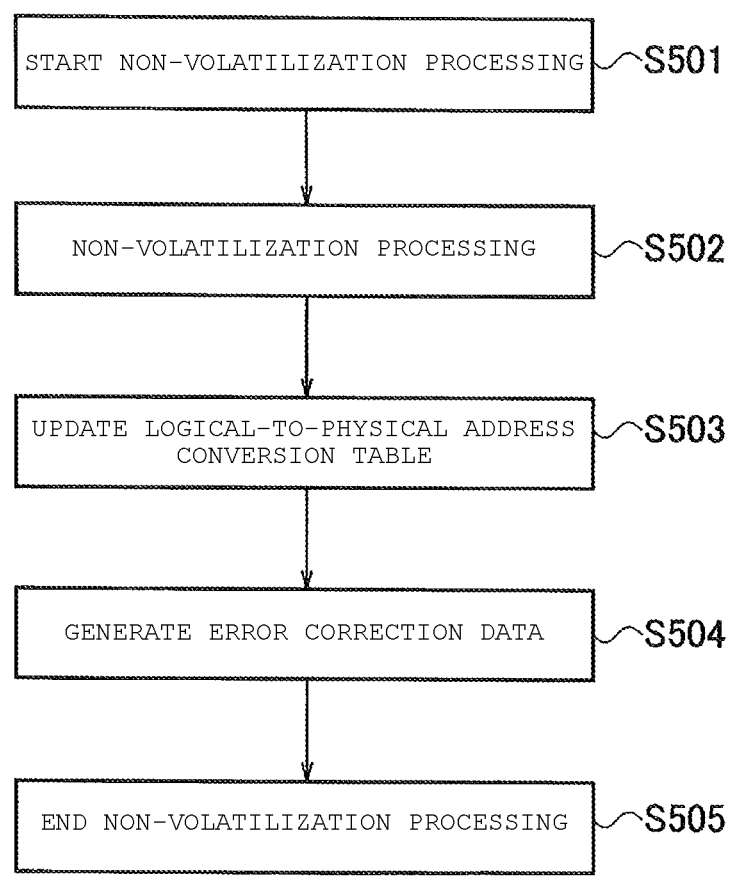

MEMORY SYSTEM

CROSS-REFERENCE TO RELATED APPLICATION

This application is based upon and claims the benefit of priority from Japanese Patent Application No. 2019-050808, filed Mar. 19, 2019, the entire contents of which are incorporated herein by reference.

FIELD

Embodiments described herein relate generally to a memory system.

BACKGROUND

In a non-volatile semiconductor memory such as a NAND flash memory including a plurality of memory chips, when there is a difference in quality among the memory chips, a difference may also occur in the time required for non-volatilization processing of data stored in volatile memory.

DESCRIPTION OF THE DRAWINGS

FIG. 13 is an explanatory view showing an example of a logical-to-physical chip number conversion table to be used in the memory controller according to the embodiment.

FIG. 14 is an explanatory view showing an example of a logical-to-physical address conversion table to be used in the memory controller according to the embodiment.

FIG. 15 is a flowchart showing an example of post-processing of non-volatilization control processing by the memory controller according to the embodiment.

DETAILED DESCRIPTION

Figure 1:
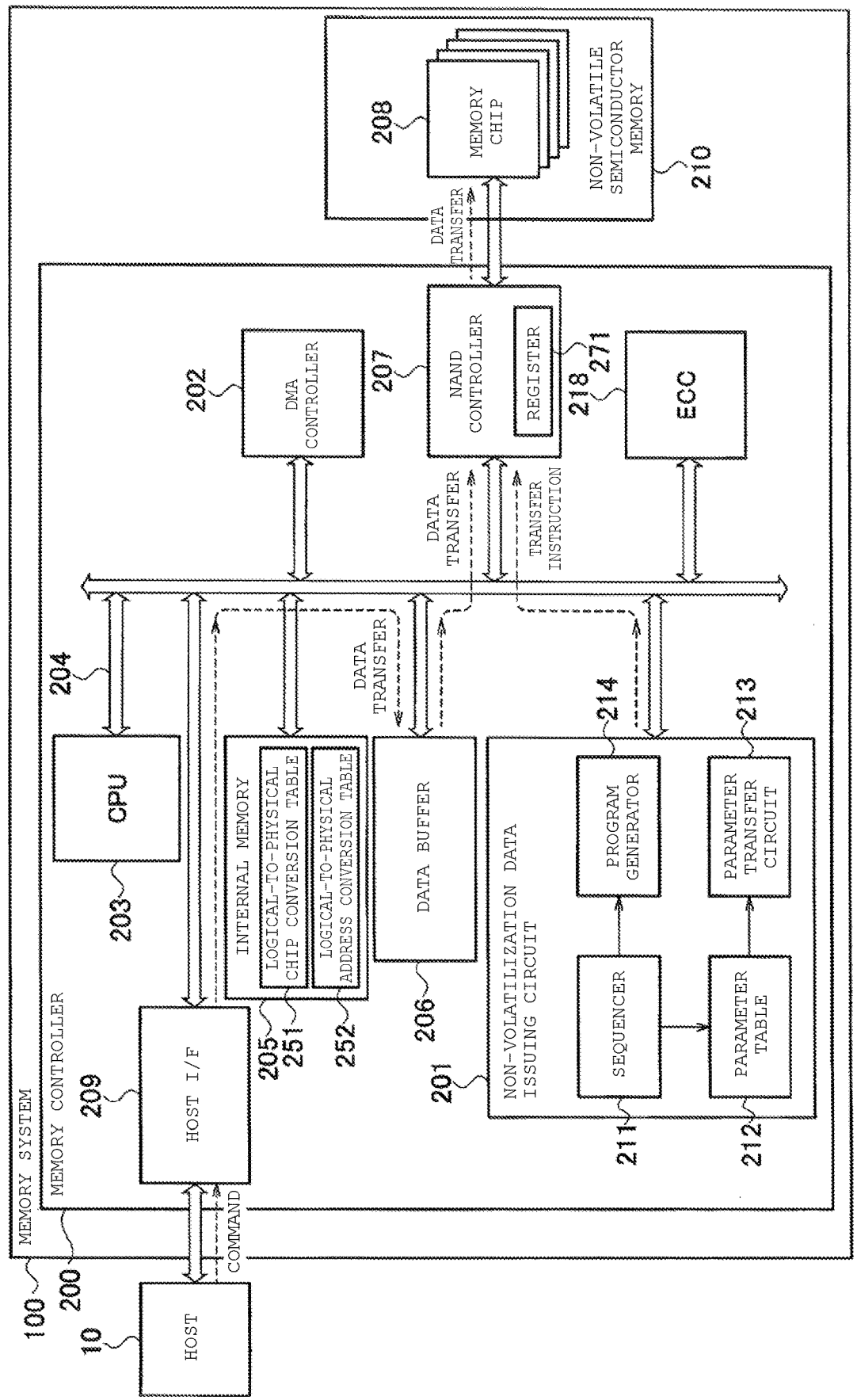
FIG. 1 is a schematic block view of a memory system and a memory controller according to an embodiment.

Embodiments provide a memory system capable of executing non-volatilization processing with good performance in the memory system equipped with a plurality of memory chips even when individual memory chips of the memory system have differences in quality.

In general, according to one embodiment, a memory system includes a plurality of non-volatile memory chips divided into a plurality of storage areas, and a memory controller that is connected to the plurality of memory chips to control an operation of each memory chip. The memory controller is configured to set an arbitration period separately for each of the respective storage areas, and to execute a process to store data into the storage areas one after another in accordance with the arbitration period set therefor.

Next, the present embodiment will be described with reference to drawings. In the description of the drawings described below, the same or similar parts are given the same or similar reference numerals. However, it should be noted that the drawings are schematic, and the relationship between the thickness and the planar dimension of each component, and the like are different from actual ones. Therefore, specific thicknesses and dimensions should be determined in consideration of the following description. Moreover, parts having different dimensional relationships and proportions are included among the drawings.

In addition, the embodiment described below provides an example of devices and methods that embody a technical idea, and do not require the specific material, shape, structure, arrangement, and the like of each component. This embodiment may be modified in various manners within the scope of the claims.

EMBODIMENT

For non-volatile storage devices (also referred to as memory systems), such as solid state drives (SSDs), multiple non-volatile memory chips may be used. Examples of the non-volatile memory include a NAND flash memory, a resistive random access memory (ReRAM), a ferroelectric random access memory (FeRAM), and a magnetoresistive random access memory (MRAM).

For example, when NAND flash memory chips of a new product are used, product quality varies. When a large capacity buffer using a dynamic random access memory (DRAM) or the like is mounted, it is possible to mask the variation in quality by having a large size buffer capacity. For example, when data is constantly transferred from the host at maximum speed, even if the performance of non-volatilization processing is insufficient, if a large capacity buffer is provided, the transfer performance of the DRAM is higher than the transfer performance of the NAND flash memory, and therefore data from the host can be received at high speed up to the size of the large capacity buffer. Therefore, it is possible to mask the variation in quality of the NAND flash memory in such cases.

On the other hand, when a large capacity buffer is not provided, the performance of the storage device depends on how smoothly the non-volatilization processing is performed while using a limited buffer memory of the memory controller.

For example, the controller of the storage device has an arbitration function of smoothly executing the non-volatilization processing in units of chips.

Usually, memory chips to be targets of non-volatilization processing are switched in order of chips (for example, in ascending order of chip numbers), but if a previous non-volatilization processing is not completed according to an original order, one or more of the memory chips may be excluded as targets of the non-volatilization processing after a predetermined arbitration period, and the non-volatilization processing may be delayed (for example, delayed by one cycle).

If the quality of the combined memory chip is uniform, even when an arbitration period is set identically for each memory chip is used, it is possible to schedule the non-volatilization processing so that such a cycle-delayed memory chip is avoided. However, if the quality of each memory chip is not uniform, when the arbitration period is set identically for each memory chip, cycle-delayed memory chips can appear, and as a result, the overall performance of the storage device will be degraded.

Therefore, in the present embodiment, paying attention to the variation in time required for the non-volatilization processing (hereinafter referred to as "non-volatilization execution time") for each memory chip of the NAND flash memory, the non-volatilization arbitration period is set for each predetermined unit (for example, set per memory chip) so that a memory chip having a relatively long non-volatilization execution time for non-volatilization does not negatively impact the performance of other memory chips having a relatively short non-volatilization execution time. As a result, an event which is not in accordance with a non-volatilization arbitration period is less likely to occur, and the overall performance of the storage device is maintained.

The non-volatilization arbitration period is also referred to herein simply as an arbitration period. The non-volatilization arbitration period may be referred to as a non-volatilization grace period or grace period, or a non-volatilization wait period or wait period.

Memory System and Memory Controller

A schematic block configuration of a memory system 100 and a memory controller 200 according to the embodiment is expressed as shown in FIG. 1.

The memory system 100 according to the embodiment includes the memory controller 200 and a plurality of memory chips 208, as shown in FIG. 1. More specifically, the memory system 100 includes a storage device such as a solid state drive (SSD) and is connectable to a host 10. The memory controller 200 is connected to the plurality of memory chips 208 to control an operation of each memory chip 208. The plurality of memory chips 208 comprise a memory chip group that constitutes a non-volatile semiconductor memory 210. Hereinafter, the memory chip 208 is referred to as a NAND flash memory chip, and the non-volatile semiconductor memory 210 is referred to as a NAND flash memory 210.

The memory controller 200 according to the embodiment is connectable to the host 10 as shown in FIG. 1 and connected to the plurality of memory chips (NAND-type flash memory chips) 208 to control the operation of each memory chip 208.

The host 10 includes, for example, a wide range of electronic devices such as servers, laptop PCs, desktop PCs, tablet PCs, mobile phones, scanners, printers, cameras, home theaters, game devices, set-top boxes, navigation systems, electronic musical instruments, and the like as targets.

As shown in FIG. 1, the memory controller 200 according to the embodiment includes a non-volatilization data issuing circuit 201, a direct memory access (DMA) controller 202, a central processing unit (CPU) 203 (also referred to herein as control unit 203), an internal memory 205, data buffer 206, a NAND controller 207, a host interface (I/F) circuit 209, an error correction code (ECC) circuit 218, and an internal bus matrix 204 interconnecting each unit in the memory controller 200, that is, the non-volatilization data issuing circuit 201, the DMA controller 202, the control unit 203, the internal memory 205, the data buffer 206, the NAND controller 207, the host I/F circuit 209, and the error correction code circuit 218. Each function of the memory controller 200 may be realized by, for example, dedicated hardware as a system-on-a-chip (SoC), or may be realized by the CPU 203 executing firmware.

The host I/F circuit 209 is an interface circuit that performs connection with the external host 10. The host I/F circuit 209 conforms to, for example, serial at attachment (SATA), serial attached SCSI (SAS), PCI Express (PCIe), NVM Express (NVMe), or the like. The DMA controller 202 is a controller that performs data transfer. The CPU 203 is a central processing unit that performs control and operation setting of each unit of the memory controller 200. The internal bus matrix 204 is a bus signal line connecting between each functional block in the memory controller 200. The internal memory 205 is, for example, a static random access memory (SRAM), and is a work memory for the CPU 203, for example. The internal memory 205 stores a logical-to-physical chip conversion table 251 and a logical-to-physical address conversion table 252 which will be described later with reference to FIGS. 13 and 14. The data buffer 206 is, for example, a dynamic random access memory (DRAM), and is a memory for temporarily storing write data to the memory chip 208 transferred from the host 10. The data buffer 206 may be provided outside the memory controller 200. The error correction code circuit 218 is a processing block that performs error correction processing on data read from the memory chip 208. The error correction code to be used for error correction processing may be, for example, Reed-Solomon (RS)) code, Bose-Chaudhuri-Hocquenghem (BCH) code, low-density parity-check (LDPC), and the like.

When data necessary for the non-volatilization processing is buffered in the data buffer 206, the non-volatilization data issuing circuit 201 has a function of generating non-volatilization address information and other attribute information necessary for writing to transmit a non-volatilization instruction to the NAND controller 207. The non-volatilization data issuing circuit 201 includes a sequencer 211, a parameter table 212, a parameter transfer circuit 213, and a program generator 214.

The parameter transfer circuit 213 transmits an index value to be used when selecting the setting value to be referred to by the NAND controller 207 for each of the predetermined units in advance before starting the non-volatilization processing, to the NAND controller 207. Here, the "predetermined unit" of the memory chip 208 is defined in units of a memory chip or in units of one physical area among a plurality of physical areas in each of the memory chips 208. Further, the "sequence" of the non-volatilization processing is a series of non-volatilization processing executed in order (for example, in ascending order of chip numbers) for each of the predetermined units.

The non-volatilization data issuing circuit 201 transmits the write data transferred from the host 10 and stored in the data buffer 206, and the logical-to-physical chip conversion table 251 and the logical-to-physical address conversion table 252 updated and stored in internal memory 205 which will be described with reference to FIGS. 13 and 14, to the NAND controller 207 as non-volatilization target data. The non-volatilization data issuing circuit 201 stores an arbitration period setting parameter in which an arbitration period to be used in the predetermined unit of non-volatilization processing in the sequence of non-volatilization processing is set, in the parameter table 212.

Figure 2:
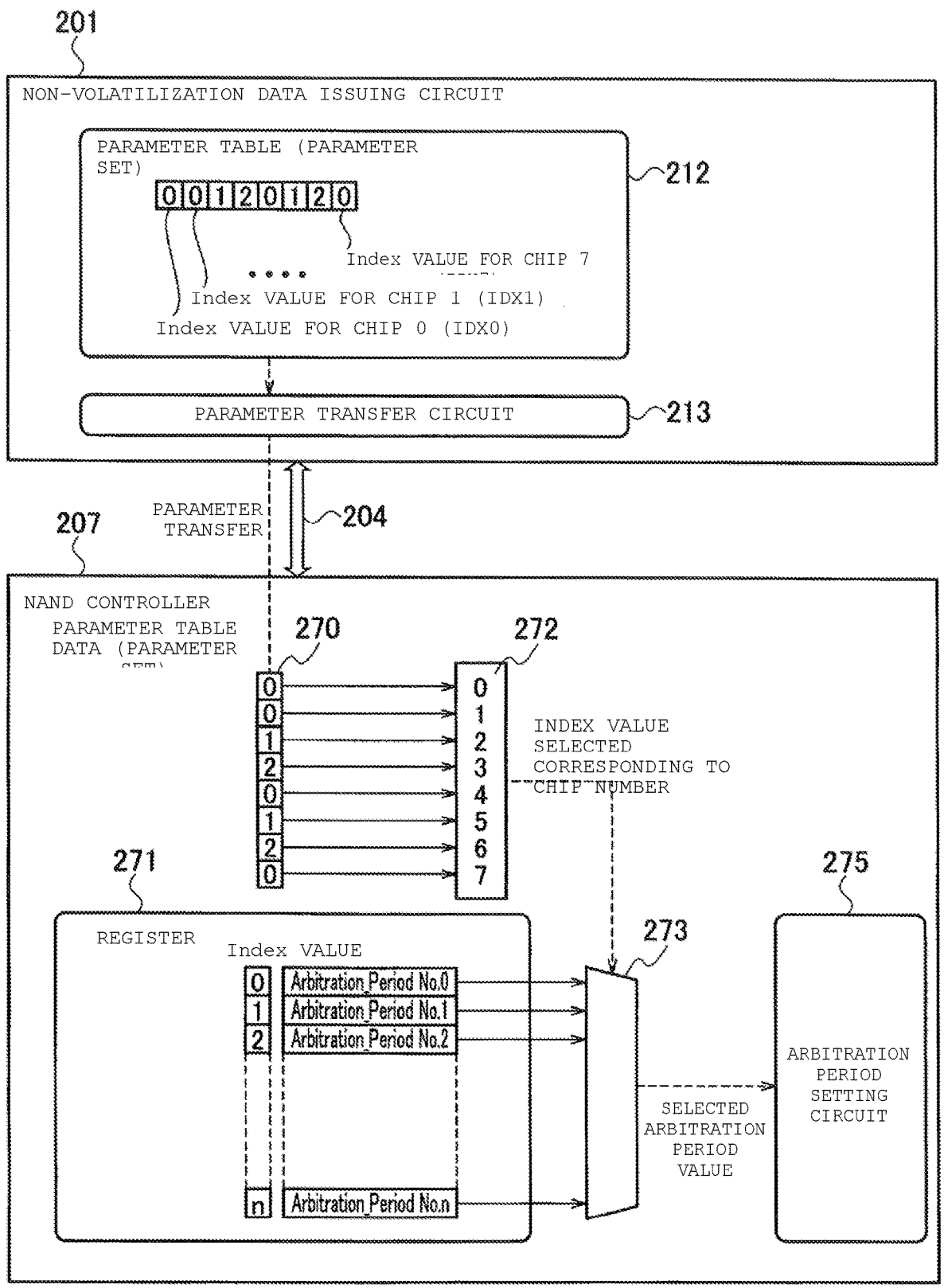
FIG. 2 is an explanatory view showing an example of a transfer method and information selection of a set of arbitration period setting parameters in the memory controller according to the embodiment.

As shown in FIG. 2, the set of arbitration period setting parameters stored in the parameter table 212 includes an index value indicating which arbitration period number (Arbitration_Period No.) is to be used for each of the predetermined units. The index value is a value of 0 to n (n is an integer of 1 or more). The set of arbitration period setting parameters has a configuration in which index values corresponding to the numbers of the non-volatilization arbitration periods are put together into one set. "One set" is, for example, when the NAND flash memory 210 is configured with eight memory chips 208, the index values (index 0 to index 7) corresponding to the numbers of non-volatilization processing periods set respectively corresponding to chips 0 to 7 are summarized for one sequence of non-volatilization processing.

When instructing the non-volatilization processing of the plurality of memory chips 208, the non-volatilization data issuing circuit 201 transmits the index value in the parameter table 212 to the NAND controller 207 via the parameter transfer circuit 213 by using the program generator 214.

When executing the non-volatilization processing on the plurality of memory chips 208 instructed by the non-volatilization data issuing circuit 201, the NAND controller 207 arbitrates the non-volatilization processing for each of the predetermined units in accordance with the arbitration period indicated by the arbitration period number corresponding to the index value transmitted from the non-volatilization data issuing circuit 201.

That is, the non-volatilization data issuing circuit 201 supplies an arbitration period setting that may be set for each series of non-volatilization processing which is sequentially executed for each of the predetermined units, to the NAND controller 207. As a result, even when there is a variation in quality for each memory chip 208, the non-volatilization processing can be arbitrated so that the cycle-delayed memory chip 208 is avoided. Therefore, the influence of the difference in quality between the memory chips 208 can be minimized, and the non-volatilization processing can be performed without degrading the performance of the storage device.

Here, if the data used for the non-volatilization processing is prepared and a previous cycle of non-volatilization processing for the memory chip 208 to be a target of non-volatilization processing is completed, within the arbitration period of the memory chip 208 to be the target of non-volatilization processing, the NAND controller 207 continues the non-volatilization processing for the memory chip 208.

On the other hand, when the data for the non-volatilization processing is not ready for storage, or the previous cycle of non-volatilization processing for the memory chip 208 to be a target of non-volatilization processing is not completed, within the arbitration period of the memory chip 208 to be the target of non-volatilization processing, the NAND controller 207 skips the non-volatilization processing for the memory chip 208.

Also, the NAND controller 207 includes index values 270 transmitted from the non-volatilization data issuing circuit 201, a non-volatilization target chip number table 272 for storing chip numbers for non-volatilization, a register 271 that holds index values and arbitration period numbers in association with each other, a selector 273 that selects the arbitration period number held in the register 271 for each of the predetermined units with reference to the index value 270 selected corresponding to the chip number of the non-volatilization target chip number table 272, and an arbitration period setting circuit 275.

The NAND controller 207 is a functional block that controls data non-volatilization processing and arbitration thereof for the memory chip 208. The NAND controller 207 selects the index value 270 of the non-volatilization arbitration period in the chip number of the memory chip 208 and associates the index value 270 with the index value in the register 271. The register 271 and the selector 273 are used to switch the index value 270 for each predetermined unit. For example, the NAND controller 207 passes the arbitration period number selected by the selector 273 in association with the chip number of the non-volatilization target chip number table 272 and the index value in the register 271 for each of the predetermined units to the arbitration period setting circuit 275. The arbitration period setting circuit 275 arbitrates the non-volatilization processing of the memory chip 208 for each of the predetermined units in accordance with the arbitration period number for each of the predetermined units.

In FIG. 2, the value of the arbitration period setting parameter set held in the parameter table 212 indicates an index value (IDX) for each memory chip 208. For example, arbitration period setting parameter set values ("0" "0" "1" "2" "0" "1" "2" "0") held in the parameter table 212 of FIG. 2 respectively correspond to an index value for chip (0) (IDX0=0), index value for chip (1) (IDX1=0), index value for chip (2) (IDX2=1), index value for chip (3) (IDX3=2), . . . , index value for chip (7) (IDX7=0) from the left. For example, if the memory chip 208 to be a target of non-volatilization is the chip (2), the NAND controller 207 selects "1" which is the index value corresponding to the third chip number "2" from the top of the non-volatilization target chip number table 272 among the index values 270, selects the value of the arbitration period set to the arbitration period number (Arbitration_Period No. 1) corresponding to the index value=1 in the register 271 by the selector 273, and passes the value to the arbitration period setting circuit 275.

The arrangement of the index values is not limited to the order of the numbers of the memory chips 208 (ascending order in the example of FIG. 2), but may be in any order.

The arbitration period setting parameter set held in the parameter table 212 of the non-volatilization data issuing circuit 201 and transmitted to the NAND controller 207 is not limited to only one set. For example, even in the same chip, if the memory address changes, the characteristics may also change, and therefore, it is also possible to prepare plural sets of arbitration period setting parameters corresponding to a plurality of physical area units of the memory chip 208, respectively.

Figure 3:
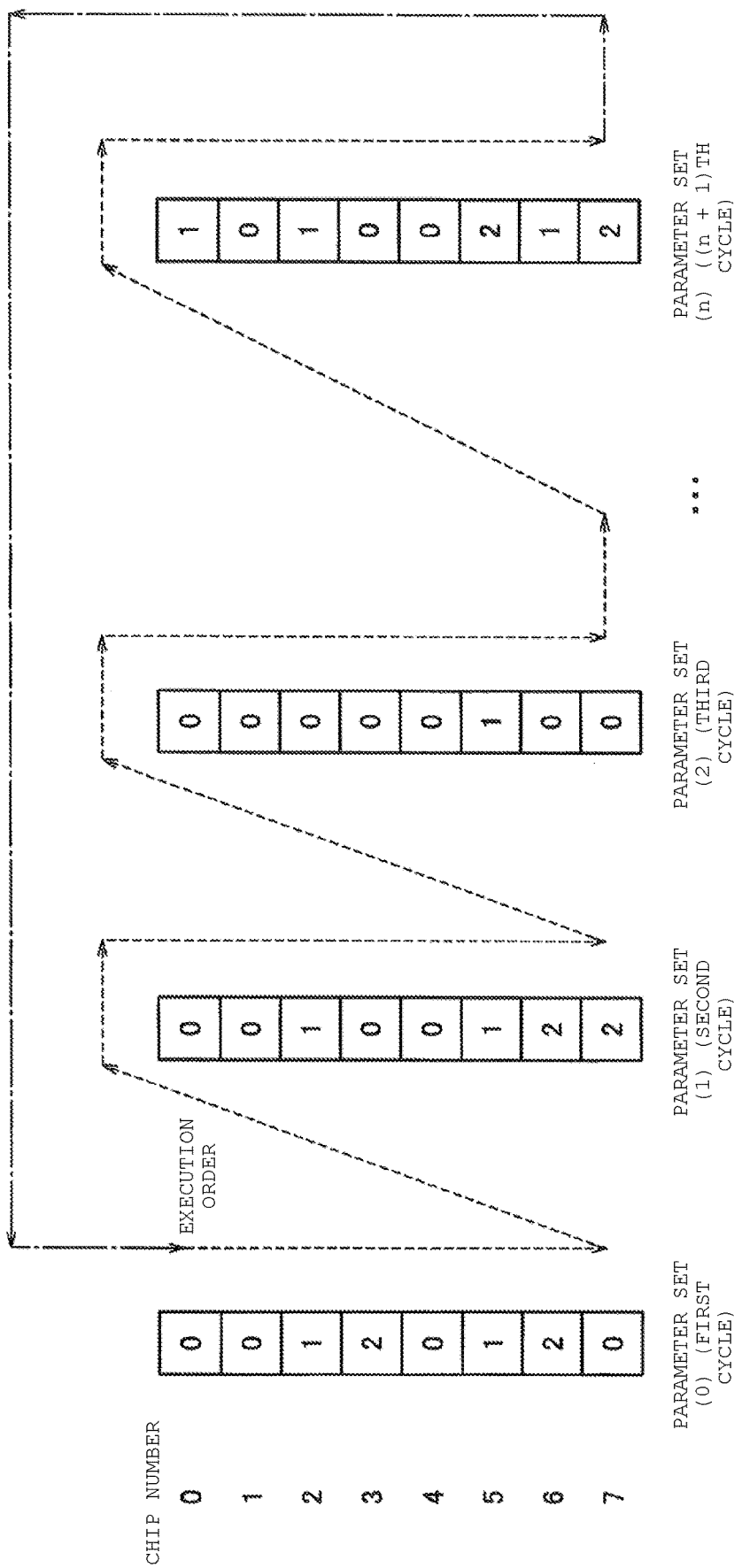
FIG. 3 is an explanatory view showing a processing procedure example in the case of using a plurality of sets of arbitration period setting parameters.

When plural sets of arbitration period setting parameters are used, an example of a processing procedure is expressed as shown in FIG. 3. The example shown in FIG. 3 shows an example of an arbitration period setting parameter set (0 to n) for executing non-volatilization processing for n+1 cycles (n is an integer of 2 or more) for each memory chip (0 to 7). Hereinafter, the number (n) indicating a (n+1)th cycle of arbitration period setting parameter set is referred to as a parameter set number (PARAM_SET_NUM). In the present embodiment, the number of cycles that can be set is not particularly limited. In practice, when the firmware of the memory controller 200 or the like sets the number of cycles, it is also possible to set a set of parameters for the number of cycles with some allowance so as not to apply an excessive load on the firmware.

As shown in FIG. 3, a first set of arbitration period setting parameters (0) may be used for a first cycle of non-volatilization processing, a second set of arbitration period setting parameters (1) may be used for a second cycle of non-volatilization processing, a third set of arbitration period setting parameters (2) may be used for a third cycle of non-volatilization processing, and an n-th set of arbitration period setting parameters (n) may be used for the (n+1)th cycle of non-volatilization processing.

Non-Volatilization Control Processing: Non-Volatilization Data Issuing Unit

Figure 4:
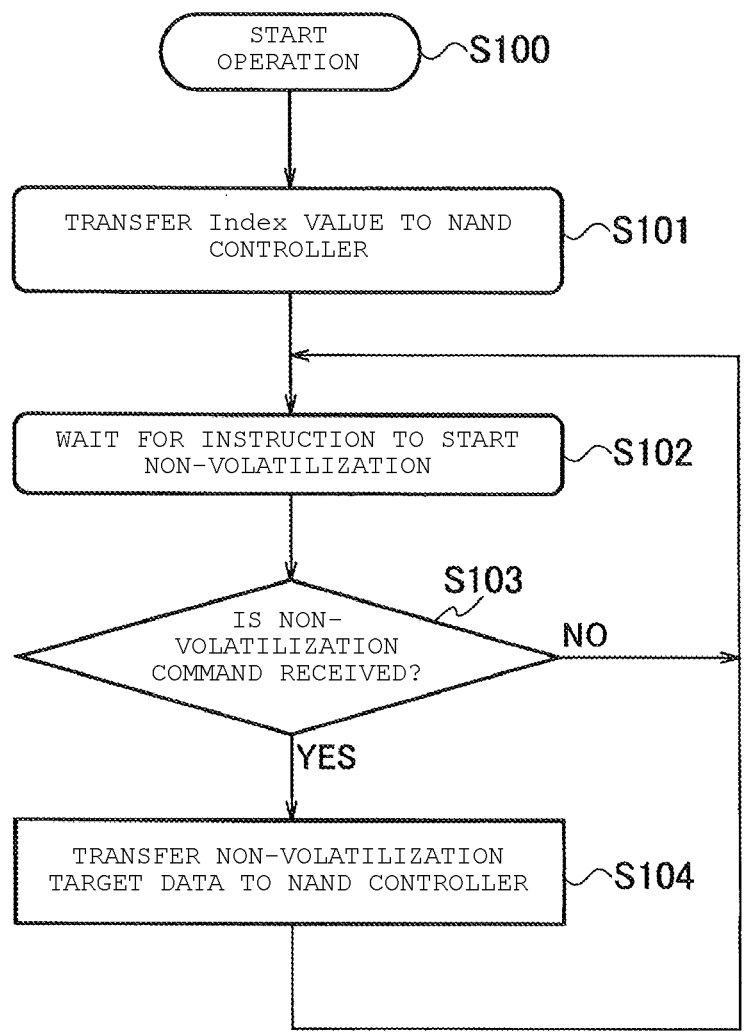
FIG. 4 is a flowchart showing an example of non-volatilization control processing by the memory controller according to the embodiment.

A flowchart of an example of non-volatilization control processing by the non-volatilization data issuing circuit 201 of the memory controller 200 according to the embodiment is shown in FIG. 4.

(a) First, when an operation is started in step S100, the non-volatilization data issuing circuit 201 sets a first set of arbitration period setting parameters in the parameter table 212 in advance.

(b) Next, in step S101, the non-volatilization data issuing circuit 201 transfers the set of arbitration period parameters including the index value in the parameter table 212 to the NAND controller 207 together with the transfer instruction.

(c) Next, in step S102, the non-volatilization data issuing circuit 201 shifts to a state of waiting for an instruction to start the non-volatilization processing, for example, a non-volatilization command from the host 10.

(d) Next, in step S103, when a command to start non-volatilization processing is received from host 10 via the host I/F circuit 209 (that is, when the result of the determination in step S103 is YES), the method flows to step S104, and the CPU 203 starts to transfer non-volatilization target data to the NAND controller 207. More specifically, the non-volatilization data issuing circuit 201 that received an instruction to start non-volatilization processing from the CPU 203 may transfer non-volatilization target data to the NAND controller 207 by using the DMA controller 202.

In response to this, the NAND controller 207 executes non-volatilization control processing as exemplified in FIG. 5 below.

Non-Volatilization Control Processing: NAND Controller

Figure 5:
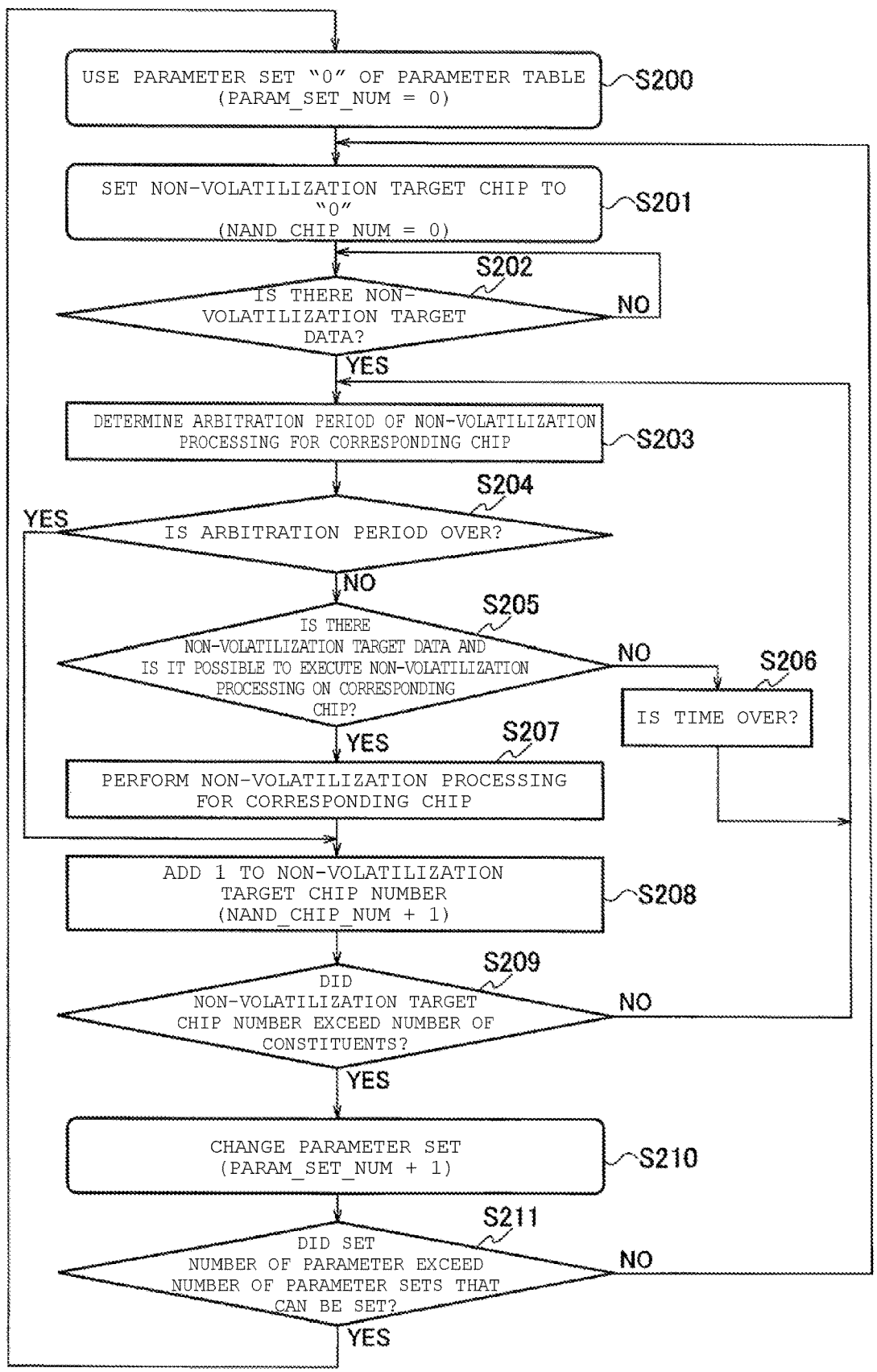
FIG. 5 is a flowchart showing an example of non-volatilization control processing by the memory controller according to the embodiment.

A flowchart showing an example of non-volatilization control processing by the NAND controller 207 of the memory controller 200 according to the embodiment is shown in FIG. 5.

(A) First, at the start of the first cycle of processing, the NAND controller 207 starts processing from the set of arbitration period setting parameters in which the parameter set number transferred in advance from the non-volatilization data issuing circuit 201 is 0 (step S200) and the non-volatilization chip number is 0 (step S201).

(B) Next, in step S202, the NAND controller 207 shifts to a state of waiting for non-volatilization target data that corresponds to the memory chip whose chip number is 0.

(C) Next, in step S203, when the non-volatilization target data has arrived (for example, the result of the determination in step S202 is YES), the NAND controller 207 determines the arbitration of the non-volatilization processing for the corresponding memory chip 208. Here, "determination of arbitration" is determination of whether or not the non-volatilization processing can be performed on the corresponding memory chip 208. The arbitration period to be used at that time is a period set according to the "arbitration period number (Arbitration_Period No.)" determined from the index value of the arbitration period setting parameter set and the non-volatilization target chip number table 272 as described above. More specifically, the arbitration period number is selected by using the index value indicated by the non-volatilization target chip number (NAND_CHIP_NUM) (step S201) among the parameter sets indicated by the parameter set number (PARAM_SET_NUM) (step S200). Then, the arbitration period value indicated by the arbitration period number is selected, and the arbitration determination is made.

(D) Next, in steps S204 and S205, in the case of the first cycle of non-volatilization processing, when non-volatilization data arrives, it is possible to perform non-volatilization processing on the corresponding memory chip 208, that is, the NAND controller 207 is not in the state of waiting for the first cycle of non-volatilization processing to be completed, proceeding to step S207, the NAND controller 207 immediately executes the non-volatilization processing.

That is, with regard to the first cycle of non-volatilization processing, since non-volatilization processing is not performed prior to that, there is no influence of the non-volatilization execution time of the NAND chip itself. Therefore, when non-volatilization data arrives, non-volatilization can be performed immediately.

(E) Next, in step S205, when non-volatilization data has not arrived, proceeding to step S206, the NAND controller 207 waits for arrival of non-volatilization data for a predetermined time, and then returns to step S203 to retry until the arbitration period is over.

(F) Next, when the first cycle of non-volatilization processing for the corresponding memory chip 208 is completed, proceeding to step S208, the NAND controller 207 adds 1 to the non-volatilization target chip number (that is, sets a next memory chip 208 as a new target) and performs the processing in steps S203 to S207. This processing is repeated by the number of components of the memory chip 208 (step S209).

(G) Next, for the second and subsequent cycles, when the previous non-volatilization processing is not completed, even if non-volatilization data arrived, the memory chip 208 may be affected by the non-volatilization execution time of the memory chip 208 itself.

(H) In the determination processing of step S204, until the arbitration period is over (that is, when the result of the determination in step S204 is NO), the NAND controller 207 determines whether the non-volatilization processing can be performed on the corresponding memory chip 208 (step S205), and if a non-volatilization condition is not satisfied (that is, when the result of the determination in step S205 is NO), the NAND controller 207 continues to determine whether or not the non-volatilization condition is satisfied until the arbitration period is over (step S205). If it is possible to execute the non-volatilization processing (that is, when the result of the determination in step S205 is YES), the NAND controller 207 immediately executes non-volatilization processing (step S207).

(I) In the determination processing of step S204, when the arbitration period is over (for example, when the result of the determination in step S204 is YES), for that memory chip 208, the processing of steps S205 to S207 is skipped (that is, the corresponding memory chip 208 is delayed by a cycle), and proceeding to step S208, where the NAND controller 207 shifts to the non-volatilization processing of the next memory chip 208. For the cycle-delayed memory chip 208, the non-volatilization processing is retried during the next cycle.

(J) In step S209, if the non-volatilization target chip number (that is, the number of chips for which non-volatilization processing is completed) exceeds the number of mounted memory chips 208 (that is, when the result of the determination in step S209 is YES), in step S210, the NAND controller 207 adds 1 to the parameter set number (PARAM_SET_NUM) specifying the arbitration period setting parameter set to be used to select a next parameter set.

(K) Next, in step S211, if the parameter set number (PARAM_SET_NUM) does not exceed the number of parameter sets that can be set (that is, when the result of the determination in step S211 is NO), returning to step S201, the NAND controller 207 performs non-volatilization processing by using the next parameter set.

(L) In step S211, if the parameter set number (PARAM_SET_NUM) exceeds the number of parameter sets that can be set (that is, when the result of the determination in step S211 is YES), returning to step S200, the NAND controller 207 returns the parameter set number (PARAM_SET_NUM) to "0" (initial value) (that is, returns to the first cycle of processing).

Example of Non-Volatile Control Process According to Comparative Example

Figure 6:
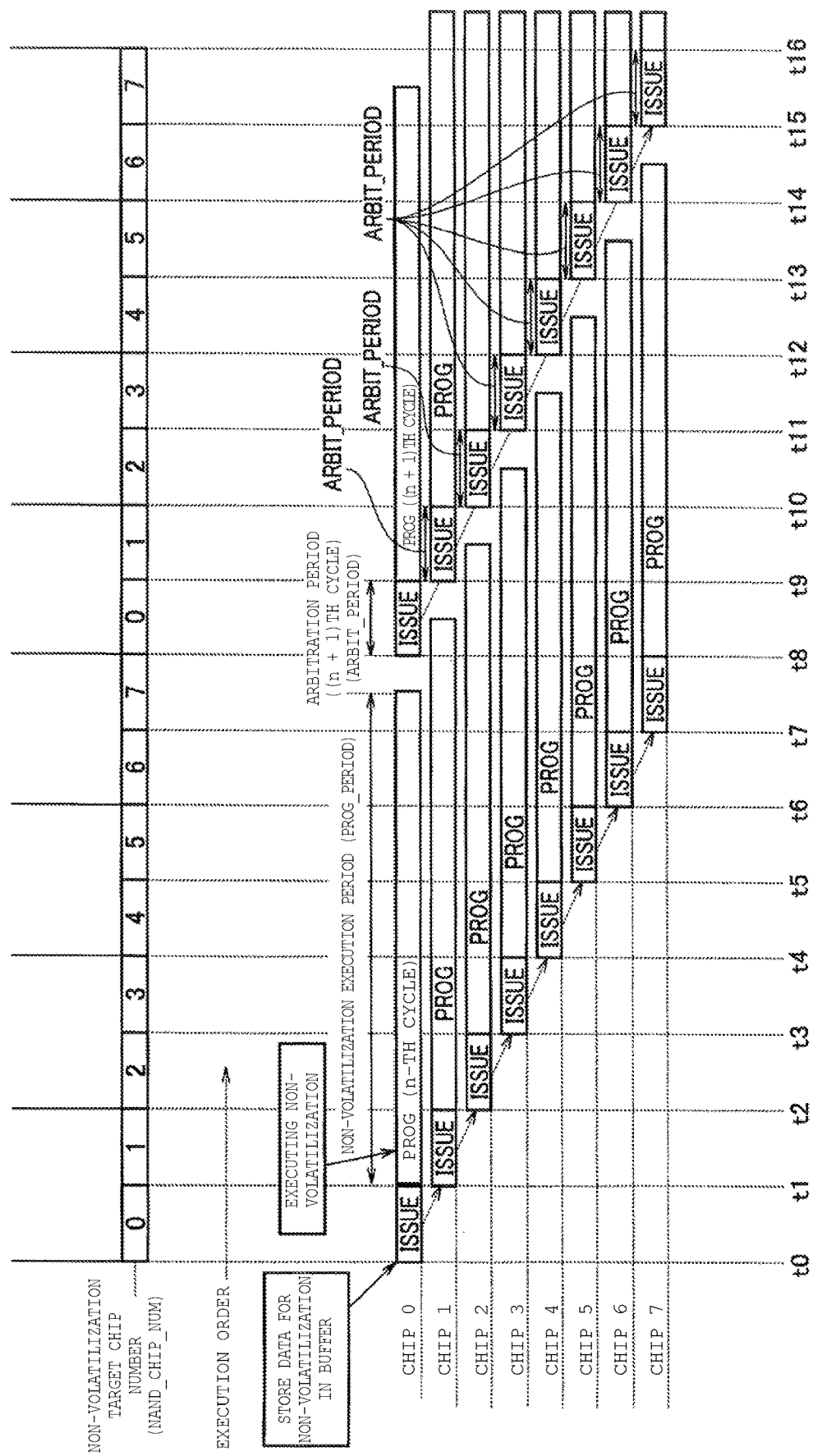
FIG. 6 is a timing chart showing an example of non-volatilization control processing (case where the non-volatilization processing is completed) in a comparative example.
Figure 7:
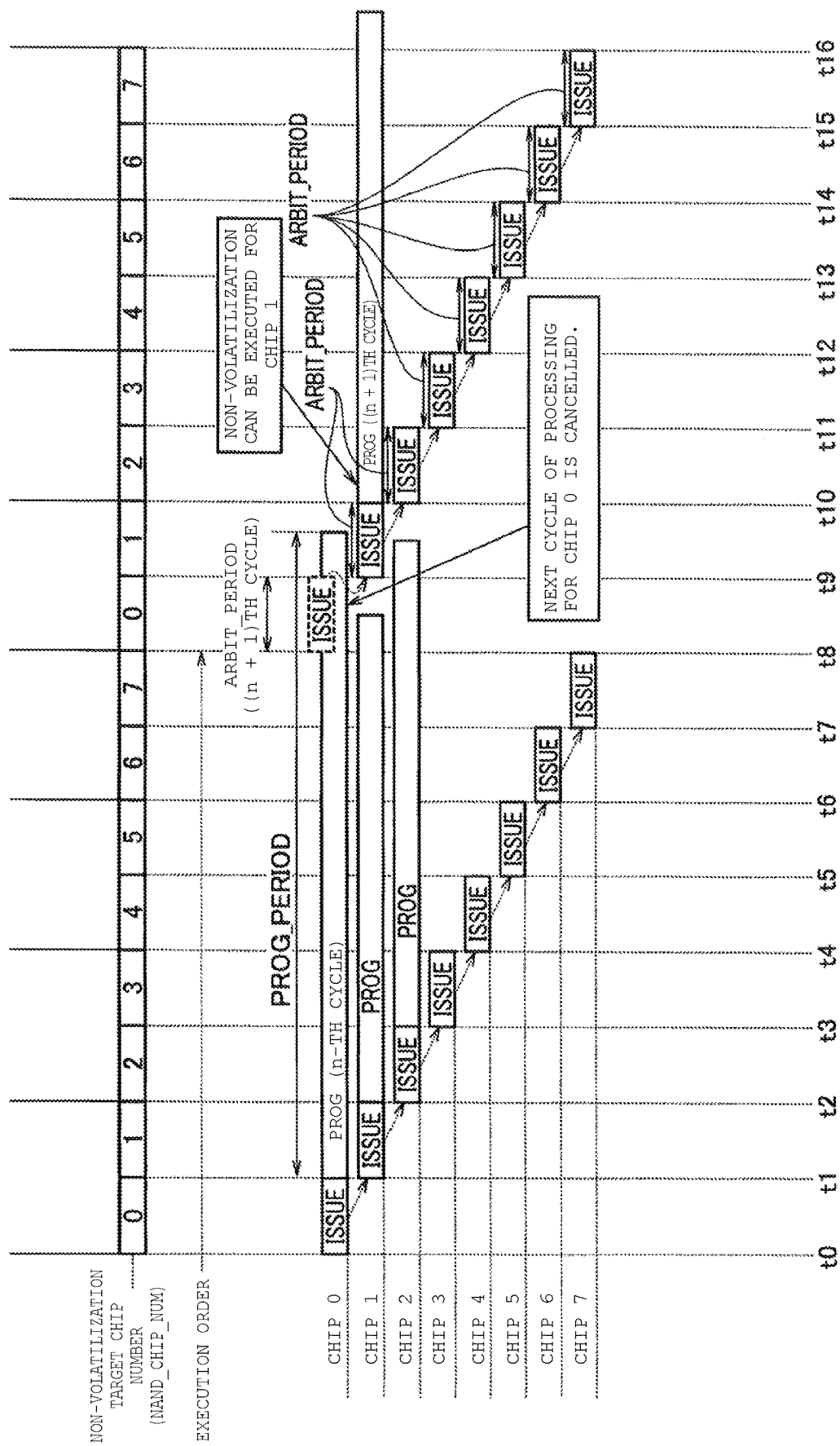
FIG. 7 is a timing chart showing an example of non-volatilization control processing (case where a cycle delay occurs) in the comparative example.

A timing chart of the non-volatilization control processing (case where non-volatilization processing is completed) in the comparative example is expressed as shown in FIG. 6, and a timing chart of the non-volatilization control processing (in case of cycle delay) in the comparative example is expressed as shown in FIG. 7.

In the drawing, "ISSUE" indicates a period during which non-volatilization target data is stored in the data buffer 206 and further transferred by the NAND controller 207. Further, in the drawing, "PROG" indicates a period (PROG_PERIOD) during which the non-volatilization processing is performed on the corresponding memory chip 208.

In the comparative example, as shown in FIGS. 6 and 7, the same arbitration period is set for all memory chips. The transfer of non-volatilization data in the (n+1)th cycle must be completed within the arbitration period of the (n+1)th cycle. As soon as the transfer of the (n+1)th cycle of non-volatilization data for a certain memory chip 208 is completed, the transfer of the (n+1)th cycle of non-volatilization data for the next memory chip 208 is started.

In an example where the problem of cycle delay does not occur, as shown in FIG. 6, when the target memory chip 208 is selected as a non-volatilization target of the (n+1)th cycle, an n-th cycle of non-volatilization processing for the memory chip 208 is completed, and the (n+1)th cycle of non-volatilization target data can be transferred to the corresponding NAND controller 207. For example, in the chip 0, the n-th cycle of "PROG" processing is completed before the start (time t8) of the (n+1)th cycle of "ISSUE" period, and in the chip 1, the n-th cycle of "PROG" processing is completed before the start (time t9) of the (n+1)th cycle of "ISSUE" period. Similarly, in the chip 7, the n-th cycle of "PROG" processing is completed before the start (time t15) of the (n+1)th cycle of "ISSUE" period. In this case, it is possible to perform non-volatilization without delay while switching the target chips of the non-volatilization processing in ascending order.

In an example where the problem of cycle delay occurs, as shown in FIG. 7, when the target memory chip 208 is selected as the (n+1)th cycle of non-volatilization target, the n-th cycle of non-volatilization processing for the memory chip 208 is not completed. For example, as shown in FIG. 7, the n-th cycle of "PROG" processing for the chip 0 is not completed even when the end time (time t9) of the (n+1)th cycle of the arbitration period for the chip 0 is reached, as a result, the (n+1)th cycle of non-volatilization processing for the chip 0 is skipped (that is, resulting in cycle delay).

When RAID is configured with a plurality of chips, to generate parity information for error correction for a chip, for example, the non-volatilization processing needs to be completed for all non-volatilization target data in a cycle. When parity information is generated for every cycle, for example, it is not possible to generate parity information for error correction by using the second cycle of non-volatilization processing target data at the time when non-volatilization target data for which non-volatilization processing is not completed remains due to cycle delay in the second cycle of the chip 2. In a state where parity information for error correction in the second cycle cannot be generated, the non-volatilization processing cannot be performed on non-volatilization target data in the third and subsequent cycles. This is because, in order to generate parity information for error correction in the second cycle, it is necessary to leave the second cycle of non-volatilization target data in the data buffer 206, and as a result, the available memory of the data buffer 206 becomes small, and it is difficult to perform non-volatilization processing on the third and subsequent cycles.

In the comparative example, since the length of the arbitration period is the same for each chip, when the arbitration period is set to be long in accordance with the non-volatilization execution period of the chip 0 in order to avoid the cycle delay of the chip 0, the arbitration period of all other memory chips 208 becomes longer, leading to performance degradation.

Example of Non-volatilization Control Processing According to Embodiment

Figure 8:
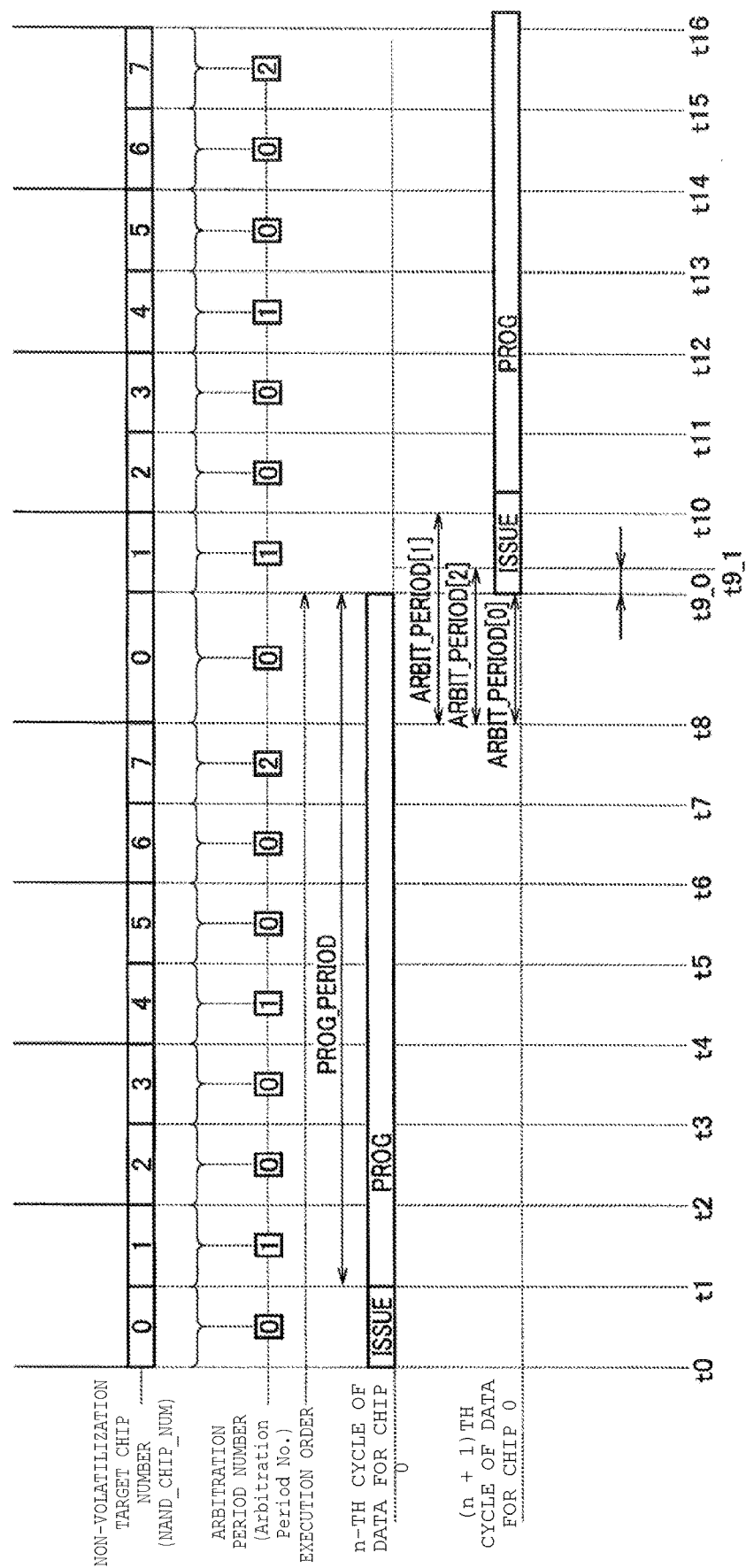
FIG. 8 is a timing chart showing an example of non-volatilization control processing according to the embodiment.
Figure 9:
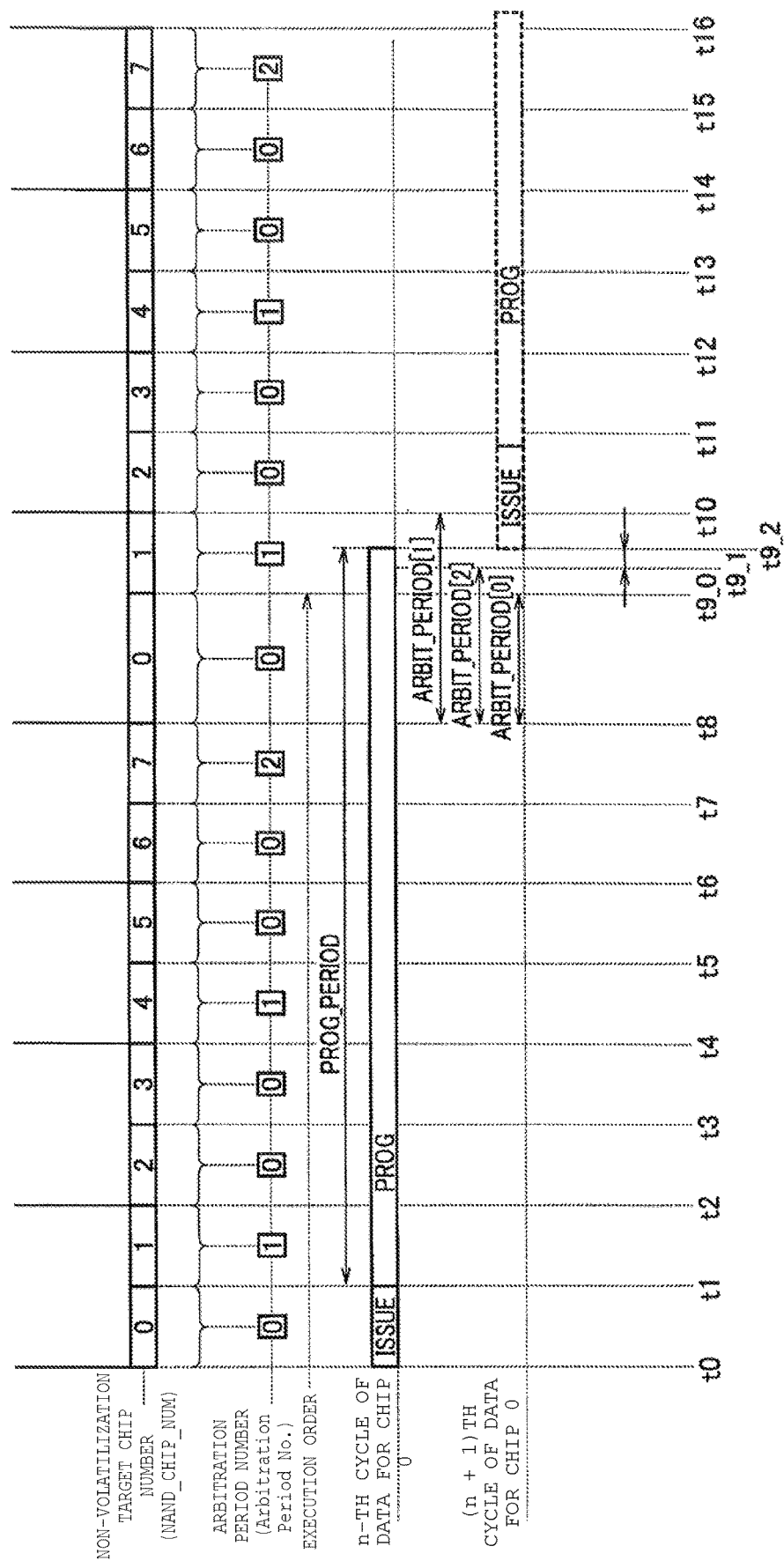
FIG. 9 is a timing chart showing another example of non-volatilization control processing according to the embodiment.

A timing chart showing an example of the non-volatilization control process in the embodiment is expressed as shown in FIG. 8, and a timing chart showing another example of the non-volatilization control processing in the embodiment is expressed as shown in FIG. 9.

In the embodiment, the arbitration period is set for each of the predetermined units. In the comparative example, an arbitration period having a uniform length was used for every chip, but in the embodiment as shown in FIG. 8, for example, a period corresponding to the length from time t8 to t9_1 is allocated to the (n+1)th cycle of arbitration period for the chip 0.

Figure 11:
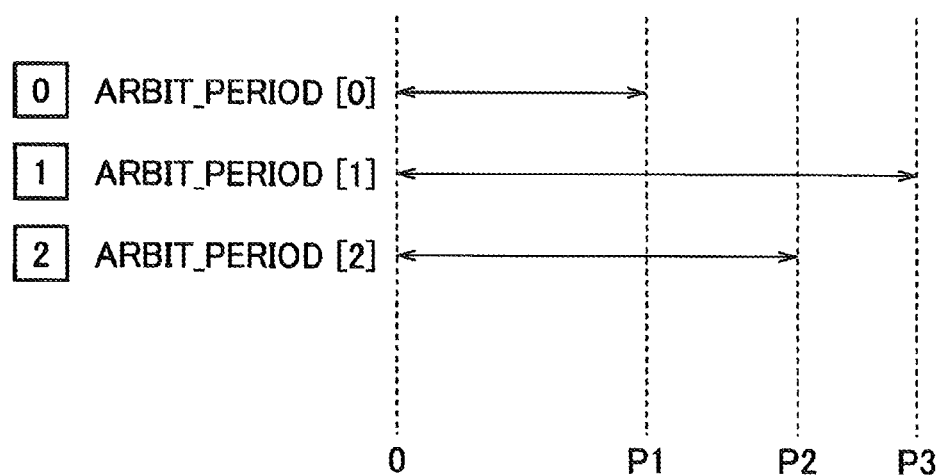
FIG. 11 is an explanatory view showing a setting example of the set of arbitration period setting parameters in the embodiment.

The arbitration period assigned here is divided into a plurality of types (three types in the example of FIG. 11) according to the quality of each memory chip 208 as illustrated in FIG. 11, for example. That is, ARBIT_PERIOD[0] having a length of P1, ARBIT_PERIOD[1] having a length of P3, and ARBIT_PERIOD[2] having a length of P2 are prepared and assigned to each memory chip 208. Here, P1<P2<P3. The arbitration period is not limited to three as shown in FIG. 11, and may be two or four or more. Further, the length of the arbitration period may be appropriately adjusted in accordance with the performance of the memory chip 208. In one embodiment, the length of the arbitration period for a memory chip is adjusted based on the number of program/erase cycles that the memory chip has been subjected to.

As shown in FIG. 8, if the n-th cycle of non-volatilization processing for the chip 0 is completed during the (n+1)th cycle of arbitration period (from time t8 to t9_1), the (n+1)th cycle of non-volatilization processing for the chip 0 is performed. Therefore, in the (n+1)th cycle of the chip 0, it is preferable to assign ARBIT_PERIOD[2] of a length corresponding to the optimum length from time t8 to t9_1 instead of ARBIT_PERIOD[0] of a length corresponding to time t8 to t9_0 or ARBIT_PERIOD[1] of a length corresponding to time t8 to t10.

On the other hand, as shown in FIG. 9, when the non-volatilization processing in the n-th cycle for the chip 0 takes time t9_2, in order to prevent the cycle delay, it is preferable to assign ARBIT_PERIOD[1] of a length corresponding to time t8 to t10 in the (n+1)th cycle of arbitration period instead of ARBIT_PERIOD[2] of a length corresponding to time t8 to t9_1.

In the embodiment, the arbitration period is set for each predetermined unit, that is, for each memory chip 208 or for each of physical areas of each memory chip 208. As a result, an appropriate arbitration period can be set for a memory chip that is inferior in performance to other memory chips and that requires a longer time for non-volatilization processing.

Figure 10:
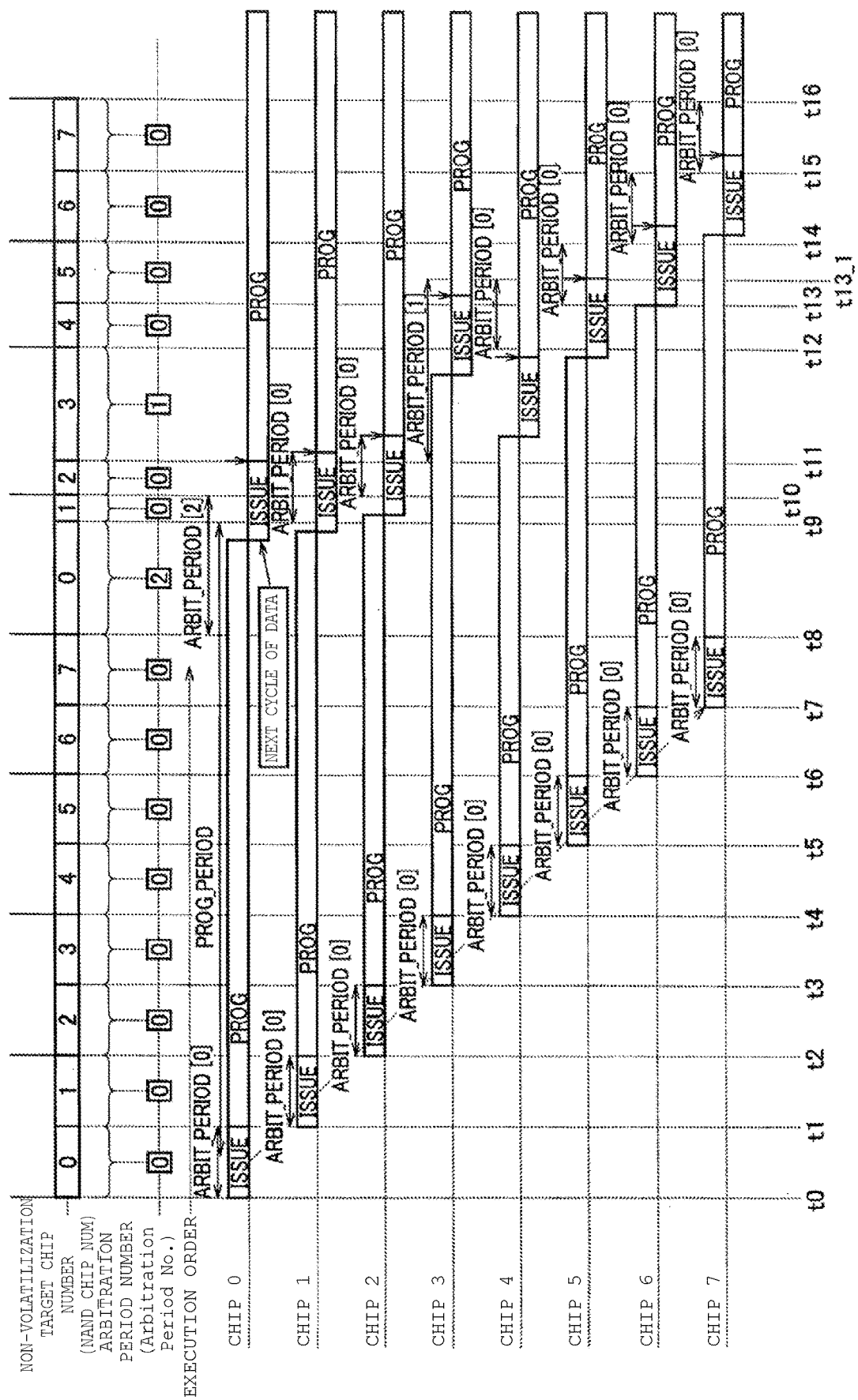
FIG. 10 is a timing chart showing an example of non-volatilization control processing according to the embodiment.

A timing chart showing an example of the non-volatilization control processing in the embodiment is expressed as shown in FIG. 10.

In the example of FIG. 10, arbitration periods divided into three types as shown in FIG. 11, that is, ARBIT_PERIOD [0], ARBIT_PERIOD[1], and ARBIT_PERIOD[2] are prepared, and an arbitration period is assigned to each memory chip 208. However, for the first cycle, the same arbitration period (ARBIT_PERIOD[0]) is set for each of the chips 0 to 7.

For the second and subsequent cycles, ARBIT_PERIOD [2] is set for the chip 0, ARBIT_PERIOD[1] is set for the chip 3, and ABIT_PERIOD[0] is set for other chips 1 and 2, and 4 to 7. As described above, ARBIT_PERIOD[0] is the shortest period (P1), ARBIT_PERIOD [1] is the longest period (P3), and ARBIT_PERIOD [2] is the period (P2) of a length between P1 and P3. Therefore, ARBIT_PERIOD[0] is set to the chips 1 and 2, and 4 to 7 which have a short execution time for non-volatilization processing, ARBIT-_PERIOD[1] is set to the chip 3 which has a long execution time for non-volatilization processing, and next, ARBIT-_PERIOD[2] is set to the chip 0 which has a long execution time for non-volatilization processing.

Therefore, as shown in FIG. 10, for the chip 3 having the longest execution time of the non-volatilization processing, and the chip 0 having the next longest execution time of the non-volatilization processing next, it is possible to avoid the cycle delay with the arbitration periods (ARBIT_PERIOD [1] and ARBIT_PERIOD[2]) individually adjusted and set. That is, for the chip 0, the first cycle of non-volatilization processing is completed within the two cycles of arbitration period (time t8 to t10 equal to ARBIT_PERIOD [2]). Similarly, for the chip 3 as well, the first cycle of non-volatilization processing is completed within the two cycles of arbitration period (time t11 to t13_1 equal to ARBIT_PERIOD [1]).

The starting point of each arbitration period in FIG. 10 is the starting point when the non-volatilization target chip number at the top of FIG. 10 is switched. That is, for example, the starting point of the (n+1)th cycle of arbitration period for the chip 0 is when the n-th cycle of arbitration period for all of the chips 0 to 7 is completed. In addition, in the example shown in FIG. 10, although the same arbitration period (for example, ARBIT_PERIOD [0]) is set, the length of the arbitration period may be different because the timing at which non-volatilization processing of the next chip is started differs depending on the timing at which non-volatilization processing of the data is completed.

Example of Arbitration Period Setting Processing

Figure 12:
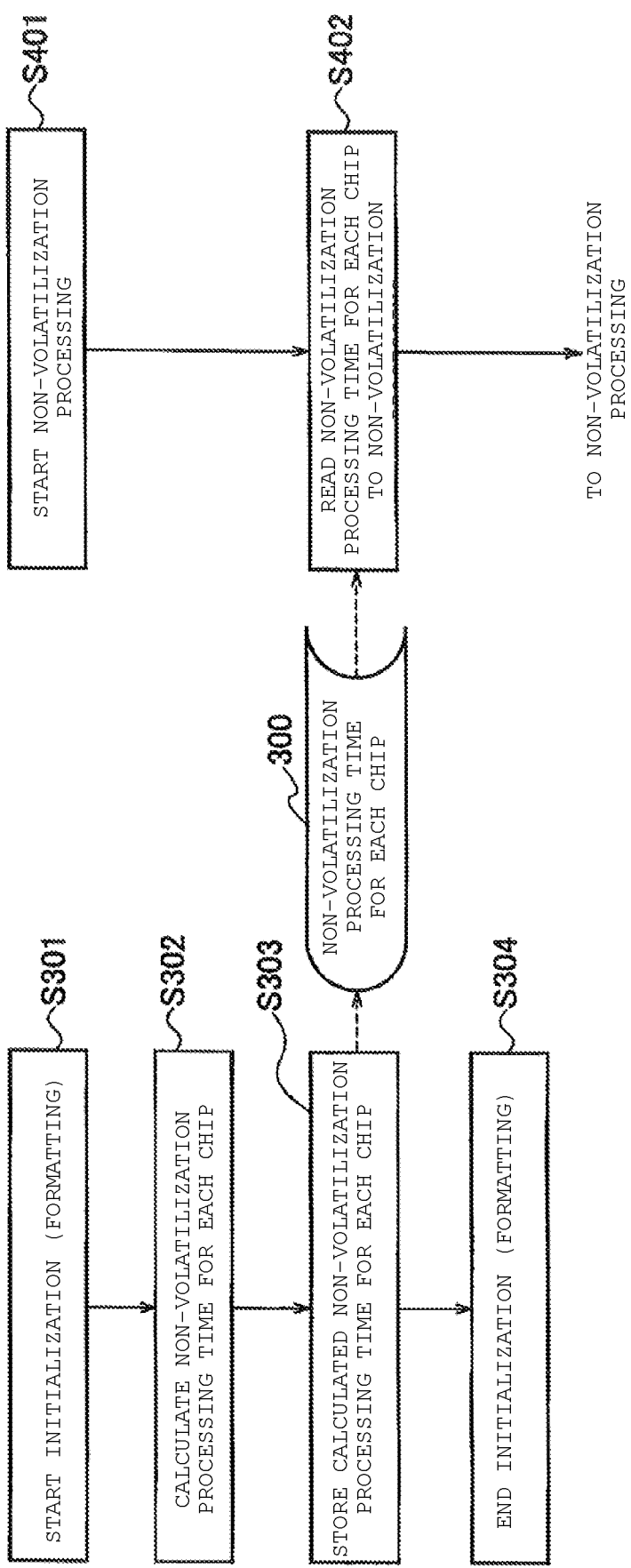
FIG. 12 is a flowchart showing an example of setting processing of the set of arbitration period setting parameters in the embodiment.

A flowchart showing an example of setting processing of the arbitration period setting parameter set in the embodiment is expressed as shown in FIG. 12. As shown in FIG. 12, for example, based on the result of the non-volatilization processing executed at the time of initialization (formatting) of the memory chip 208, from the non-volatilization processing time taken at that time, an arbitration period is calculated and set for each predetermined unit, that is, for each memory chip 208 or for each of physical areas of each memory chip 208. The timing for acquiring the non-volatilization processing time is not limited to the initialization of the memory chip 208, but various timings such as backup of the memory chip 208 and normal read/write may be assumed.

(a) First, in step S301, the memory controller 200 starts initialization processing of the memory chip 208.

(b) Next, in step S302, based on the result of the non-volatilization processing executed in the process of the initialization processing, the memory controller 200 calculates an arbitration period for each of the predetermined units from the non-volatilization processing time taken at that time.

(c) Next, in step S303, the memory controller 200 stores the arbitration period for each of the predetermined units calculated in step S302 in an arbitration period storage unit 300. The arbitration period storage unit 300 may be provided in the memory chip 208 or may be provided in the memory controller 200. Alternatively, the arbitration period storage unit 300 may be stored in an external medium (not shown) that is accessible when necessary.

(d) On the other hand, when executing the non-volatilization processing (step S401), the memory controller 200 executes the non-volatilization processing by using the arbitration period for each of the predetermined units stored in advance in the arbitration period storage unit 300 (step S402). When executing non-volatilization processing, information on the arbitration period for each of the predetermined units read from the arbitration period storage unit 300 is associated with the index value of the non-volatilization target chip and set as an arbitration period number (Arbitration_Period No.). Also, each time the address information of the NAND chip to be used changes, an arbitration period number adapted thereto is set.

As a calculation method in step S302, for example, the time required for the non-volatilization processing is calculated for each of the predetermined units, and the arbitration period can be calculated for each of the predetermined units by using the difference from the standard non-volatilization processing time ((or non-volatilization processing of high quality chip).

Post-Processing of Non-Volatilization Control Processing

An example of the logical-to-physical chip conversion table 251 to be used in the memory controller according to the embodiment is expressed as shown in FIG. 13, and an example of the logical-to-physical address conversion table 252 is expressed as shown in FIG. 14.

The logical-to-physical chip conversion table 251 is a logical-to-physical chip conversion table showing correspondence between a virtual chip number identified in the memory controller and a physical chip number of the memory chip 208, and is used when the non-volatilization processing is performed per chip of the memory chip 208.

In addition, the logical-to-physical address conversion table 252 is a logical-to-physical address conversion table showing correspondence between a logical address in the command issued by the host 10 and a physical address of the memory chip 208, and is used when the non-volatilization processing is performed on a plurality of physical area units of each memory chip 208.

A flowchart showing an example of post-processing of the non-volatilization control processing by the memory controller according to the embodiment is shown in FIG. 15.

(A) First, in step S501, the memory controller 200 starts non-volatilization processing of write data to the memory chip 208.

(B) Next, in step S502, the memory controller 200 executes non-volatilization processing.

(C) Next, when the execution of the non-volatilization processing is completed, that is, when the non-volatilization processing of all the write data related to the logical-to-physical chip conversion table 251 and the logical-to-physical address conversion table 252 is completed, in step S503, the memory controller 200 executes update processing of the logical-to-physical chip conversion table 251 and the logical-to-physical address conversion table 252. For example, the memory controller 200 updates the logical-to-physical chip conversion table 251 and the logical-to-physical address conversion table 252 when the processing of performing the non-volatilization processing of write data one time for each of all the memory chips 208 is completed a plurality of times.

(D) Next, when the logical-to-physical chip conversion table 251 and the logical-to-physical address conversion table 252 have been updated, in step S504, the memory controller 200 executes error correction data generation processing. The error correction data generation processing (step S504) is processing of generating error correction data such as restoration parity information used when an error occurs in reading data from the memory chip 208, and is executed by the ECC circuit 218 in the memory controller 200.

(E) Next, when the error correction data generation processing ends, in step S505, the memory controller 200 ends the non-volatilization processing.

Logical-to-physical address conversion table updating processing (step S503) updates the logical-to-physical address conversion table 252. For example, when writing data to the same logical address, the physical address of the memory chip 208 to be actually written changes for every write. Therefore, the memory controller 200 updates the logical-to-physical address conversion table 252 after executing the non-volatilization processing in step S502. The logical-to-physical address conversion table 252 is stored in a cache memory in the internal memory 205, and is used for the next non-volatilization processing by the memory controller 200. The logical-to-physical address conversion table 252 updated in step S503 does not have to be non-volatile immediately after the update. For example, until the cache memory in the internal memory 205 is saturated (e.g., full), the updated logical-to-physical address conversion table 252 may be held in the cache memory. While the logical-to-physical address conversion table 252 updated in the cache memory is held, data can be read from the memory chip 208 at high speed.

In addition, when updating the logical-to-physical chip conversion table 251 in the logical-to-physical address conversion table updating processing (step S 503) and, for example, when one memory chip 208 out of seven memory chip 208 groups of logical chip numbers "0" to "7" arranged for one cycle has a defective block, the memory chip 208 having the defective block may be set to the logical chip number "7", and the memory chip 208 having no other defective block may be set to the logical chip numbers "0" to "6".

In the non-volatilization processing of the memory chip 208, when the cycle-delayed memory chip 208 appears, this leads to the deterioration of the overall performance, and also affects the generation processing of the logical-to-physical address conversion table (step S503) and the generation processing of error correction data (step S504).

However, according to the present embodiment, since the appearance of cycle-delayed memory chips 208 can be avoided as much as possible, the influence on the processing of updating the logical-to-physical address conversion table (step S503) and the processing of generating error correction data (step S504) can also be reduced.

As described above, according to the present embodiment it is possible to prevent a specific chip having a longer non-volatilization execution time from being a cycle-delayed chip. Therefore, it is possible to ensure that a non-volatilization request for the same chip can be issued thereafter. Also it is possible to prevent delays in the generation of related data such as updated data of a logical-to-physical address conversion table and error correction data.

Therefore, it is possible to provide a memory system capable of executing non-volatilization processing without degrading the performance even when there is a difference in quality between memory chips.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a volatile memory in which data received from a host is buffered;
a plurality of non-volatile memory chips; and
a memory controller that is connected to the plurality of non-volatile memory chips to control the plurality of non-volatile memory chips,
wherein the memory controller is configured to:
set a plurality of arbitration periods, wherein each of the plurality of arbitration periods is for a corresponding one of the non-volatile memory chips and:
each of the plurality of arbitration periods is set according to an expected length of time to complete a process to store data buffered in the volatile memory into the corresponding non-volatile memory chip, and
each of the plurality of arbitration periods is a time period during which the memory controller is permitted to issue an instruction to the corresponding non-volatile memory chip, and after expiration of which the memory controller is not permitted to issue the instruction to the corresponding non-volatile memory chip, determine an order of a plurality of instructions to be issued sequentially to the non-volatile memory chips in association with the arbitration periods, and issue the plurality of instructions one after another to the non-volatile memory chips, respectively, in accordance with the determined order and the respective arbitration periods set therefor, wherein each of the instructions is for storing the data buffered in the volatile memory into the corresponding non-volatile memory chip, and wherein the plurality of non-volatile memory chips includes at least first and second memory chips and the memory controller is further configured to:

set a first arbitration period for the first memory chip and issue, in accordance with the determined order, a first instruction to the first memory chip to store first data buffered in the volatile memory into the first memory chip, set a second arbitration period for the second memory chip and issue, in accordance with the determined order, a second instruction to the second memory chip to store second data buffered in the volatile memory into the second memory chip, the second arbitration period being different from the first arbitration period, during the first arbitration period, determine whether to issue a third instruction to the first memory chip to store third data buffered in the volatile memory into the first memory chip, wherein the third instruction is not issued if the first memory chip continues to perform a first process to store the first data therein at the end of the first arbitration period; and the third instruction is issued if the first memory chip has completed the first process by the end of the first arbitration period; and during the second arbitration period, determine whether to issue a fourth instruction to the second memory chip to store fourth data buffered in the volatile memory into the second memory chip, wherein the fourth instruction is not issued if the second memory chip continues to perform a second process to store the second data therein at the end of the second arbitration period; and the fourth instruction is issued if the second memory chip has completed the second process by the end of the second arbitration period.

2. The memory system according to claim 1, wherein the plurality of non-volatile memory chips include first through N-th memory chips, and the memory controller is configured to sequentially issue the respective instructions to store the data buffered in the volatile memory into the first through the N-th memory chips.

3. The memory system according to claim 1, wherein each of the plurality of non-volatile memory chips contains a plurality of storage areas.

4. The memory system according to claim 1, wherein the memory controller is configured to store a set of arbitration periods of different lengths and set the arbitration period for each of the plurality of non-volatile memory chips by selecting one of the arbitration periods in the set.

5. The memory system according to claim 1, wherein the memory controller is further configured to set the first arbitration period such that the first memory chip can complete a process to store previous data therein and start the issuance of the first instruction within the first arbitration period.

6. The memory system according to claim 1, wherein the memory controller is configured to set a longer arbitration period for one of the plurality of non-volatile memory chips which has a longer expected length of time to complete the process to store the data buffered in the volatile memory therein.

7. The memory system according to claim 1, wherein the plurality of non-volatile memory chips are specified with chip numbers, and the order is determined to be an ascending order of the chip numbers.

8. A method of executing a process to store data in a plurality of non-volatile memory chips of a memory system, comprising:

buffering data received from a host in a volatile memory;

setting a plurality of arbitration periods, wherein each of the plurality of arbitration periods is for a corresponding one of the non-volatile memory chips and:

each of the plurality of arbitration periods is set according to an expected length of time to complete a process to store data buffered in the volatile memory into the corresponding non-volatile memory chip, and each of the plurality of arbitration periods is a time period during which issuance of an instruction to the corresponding non-volatile memory chip is permitted, and after expiration of which the issuance is not permitted;

determining an order of a plurality of instructions to be issued sequentially to the non-volatile memory chips in association with the arbitration periods; and issuing the plurality of instructions one after another to the non-volatile memory chips, respectively, in accordance with the determined order and the respective arbitration periods set therefor, wherein each of the instructions is for storing the data buffered in the volatile memory into the corresponding non-volatile memory chip, wherein the plurality of non-volatile memory chips includes at least first and second memory chips, and issuing the plurality of instructions further comprises:

setting a first arbitration period for the first memory chip and issuing, in accordance with the determined order, a first instruction to the first memory chip to store first data buffered in the volatile memory into the first memory chip, setting a second arbitration period for the second memory chip and issuing, in accordance with the determined order, a second instruction to the second memory chip to store second data buffered in the volatile memory into the second memory chip, the second arbitration period being different from the first arbitration period, during the first arbitration period, determining whether to issue a third instruction to the first memory chip to store third data buffered in the volatile memory into the first memory chip, wherein the third instruction is not issued because the first memory chip continues to perform a first process to store the first data therein at the end of the first arbitration period; and during the second arbitration period, determining whether to issue a fourth instruction to the second memory chip to store fourth data buffered in the volatile memory into the second memory chip, wherein the fourth instruction is issued because the second memory chip has completed the second process by the end of the second arbitration period.

9. The method according to claim 8, wherein the plurality of non-volatile memory chips include first through N-th memory chips, said method further comprising:
sequentially issuing the respective instructions to store the data buffered in the volatile memory into the first through the N-th memory chips.

10. The method according to claim 8, wherein each of the plurality of non-volatile memory chips contains a plurality of non-volatile storage areas.

11. The method according to claim 8, further comprising:
storing a set of arbitration periods of different lengths, wherein
the arbitration period for each of the plurality of non-volatile memory chips is set by selecting one of the arbitration periods in the set.

12. The method according to claim 8, wherein the first arbitration period is set such that the first memory chip can complete a process to store previous data therein and start the issuance of the first instruction within the first arbitration period.

13. The method according to claim 8, wherein a longer arbitration period is set for one of the plurality of non-volatile memory chips which has a longer expected length of time to complete the process to store the data buffered in the volatile memory therein.

14. The method according to claim 8, wherein
the plurality of non-volatile memory chips are specified with chip numbers, and the order is determined to be an ascending order of the chip numbers.

15. A memory controller for a memory system including a volatile memory in which data received from a host is buffered and a plurality of non-volatile memory chips, said memory controller comprising:
a non-volatilization instruction issuing circuit configured to:
store a parameter table in which a plurality of parameter values for getting a plurality of arbitration periods is stored, wherein each of the plurality of arbitration periods is for a corresponding one of the non-volatile memory chips and;
each of the plurality of arbitration periods is set according to an expected length of time to complete a process to store data buffered in the volatile memory into the corresponding non-volatile memory chips and
each of the plurality of arbitration periods is a time period during which issuance of an instruction to the corresponding non-volatile memory chips is permitted, and after expiration of which the issuance is not permitted;
determine an order of a plurality of instructions to be issued sequentially to the non-volatile memory chips in association with the arbitration periods, and
issue the plurality of instructions for storing the data buffered in the volatile memory into the non-volatile memory chips; and
a selection circuit configured to select an arbitration period from the plurality of arbitration periods for each of the plurality of non-volatile memory chips according to a corresponding one of the plurality of parameter values stored in the non-volatilization instruction issuing circuit, wherein
the instructions are issued one after another to the non-volatile memory chips, respectively, in accordance with the determined order and the plurality of arbitration periods selected for each of the plurality of non-volatile memory chips,
the plurality of non-volatile memory chips includes at least first and second memory chips and
the instruction issuing circuit is further configured to:
set a first arbitration period for the first memory chip and issue, in accordance with the determined order, a first instruction to the first memory chip to store first data buffered in the volatile memory into the first memory chip,
set a second arbitration period for the second memory chip and issue, in accordance with the determined order, a second instruction to the second memory chip to store second data buffered in the volatile memory into the second memory chip, the second arbitration period being different from the first arbitration period,
during the first arbitration period, determine whether to issue a third instruction to the first memory chip to store third data buffered in the volatile memory into the first memory chip, wherein
the third instruction is not issued if the first memory chip continues to perform a first process to store the first data therein at the end of the first arbitration period; and
the third instruction is issued if the first memory chip has completed the first process by the end of the first arbitration period; and
during the second arbitration period, determine whether to issue a fourth instruction to the second memory chip to store fourth data buffered in the volatile memory into the second memory chip, wherein
the fourth instruction is not issued if the second memory chip continues to perform a second process to store the second data therein at the end of the second arbitration period; and
the fourth instruction is issued if the second memory chip has completed the second process by the end of the second arbitration period.

16. The memory controller according to claim 15, wherein the plurality of non-volatile memory chips include first through N-th memory chips, and the non-volatilization instruction issuing circuit is configured to sequentially issue the respective instructions to store the data into the first through the N-th memory chips.

17. The memory controller according to claim 15, further comprising:
a register connected to the selection circuit and storing the plurality of arbitration periods.

18. The memory controller according to claim 15, wherein the first arbitration period is set such that the first memory chip can complete a process to store previous data therein and start the issuance of the first instruction within the first arbitration period.

19. The memory controller according to claim 15, wherein a longer arbitration period is selected for one of the plurality of non-volatile memory chips which has a longer expected length of time to complete the process to store the data buffered in the volatile memory therein.

20. The memory controller according to claim 15, wherein
the plurality of non-volatile memory chips are specified with chip numbers, and the order is an ascending order of the chip numbers.

* * * * *

UNITED STATES PATENT AND TRADEMARK OFFICE
CERTIFICATE OF CORRECTION

PATENT NO. : 11,354,063 B2
APPLICATION NO. : 16/556020
DATED : June 7, 2022
INVENTOR(S) : Tetsuhiko Azuma It is certified that error appears in the above-identified patent and that said Letters Patent is hereby corrected as shown below:

In the Claims

In Column 17, Claim 15, Line 40, please delete "getting" and replace with "setting".

In Column 17, Claim 15, Line 41, please delete "is" and replace with "are".

Signed and Sealed this
Second Day of January, 2024

Katherine Kelly Vidal
*Director of the United States Patent and Trademark Office*